May 13, 1958   L. W. FOSKETT ET AL   2,834,246
METHOD AND APPARATUS FOR ABSORPTION SPECTRA ANALYSIS
Filed June 16, 1954                              2 Sheets-Sheet 1

INVENTOR
Laurence W. Foskett
Norman B. Foster
William R. Thickstun
Rex C. Wood
BY Arthur Vinogral
ATTORNEY

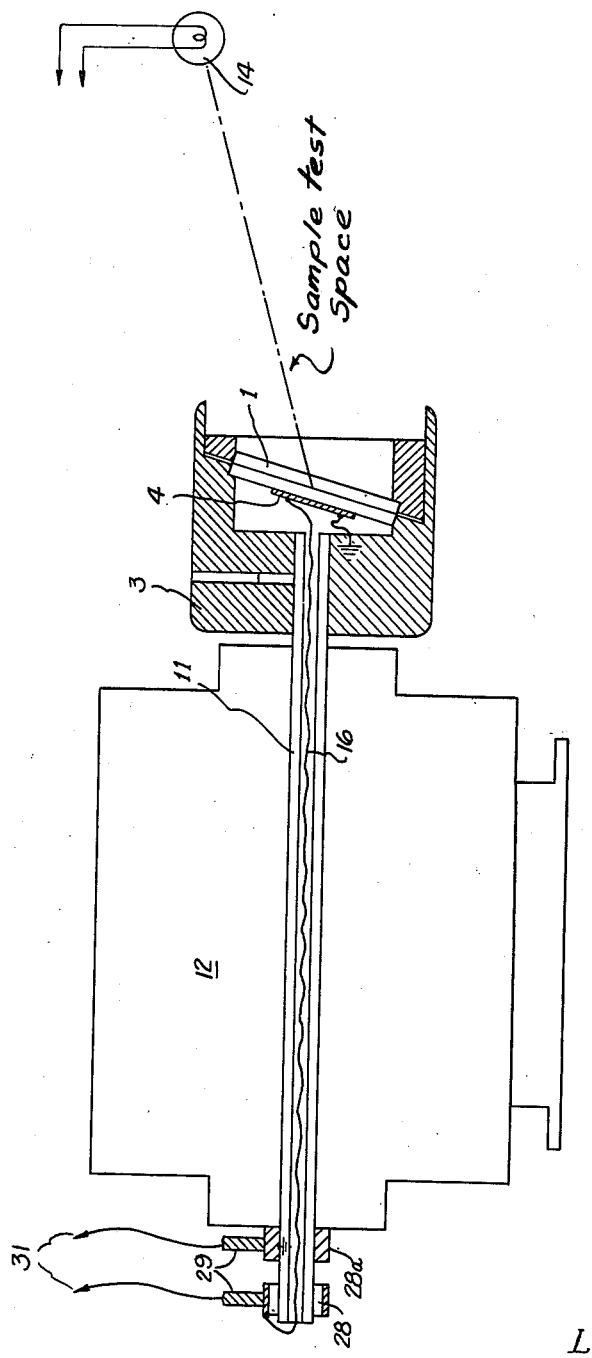

United States Patent Office 2,834,246
Patented May 13, 1958

2,834,246

METHOD AND APPARATUS FOR ABSORPTION SPECTRA ANALYSIS

Laurence W. Foskett, Washington, D. C., Norman B. Foster, Falls Church, Va., William R. Thickstun, Washington, D. C., and Rex C. Wood, Rockville, Md., assignors to the United States of America as represented by the Secretary of Commerce Application June 16, 1954, Serial No. 437,307

7 Claims. (Cl. 88—14)

This invention relates to analytical methods and apparatus and more particularly relates to absorption spectra methods and apparatus for the detection and measurement of atmospheric water vapor or other selected gases or constituents in the atmosphere or in other media.

The property of certain materials to absorb particular wave lengths of radiant energy has been utilized heretofore to detect the presence of the material or to measure the concentration of the material in gases, liquids, or solids. In the prior art, several types of optical instruments—for instance, gas analyzers—utilize the ratio of the light energies in two appropriate groups of light waves from a light source as a measure of the concentration of a given gas or liquid in a light path. "Light" as used in this application includes radiant energy in the ultraviolet, visible, and infrared spectra. In the gas analyzers one band of wave lengths is chosen in a portion of the spectrum which is known to be attenuated or absorbed by the gas or liquid to be analyzed, and the other band is chosen close by, spectrally speaking, but just out of the area of absorption. The ratio of the energies from the two bands can then be used as an indication of the quantity of absorbing material. As the concentration of the absorbing material changes, the ratio of the energies in these two bands also changes. In copending application No. 322,837, filed by the present inventors November 26, 1952, for Method and Apparatus for Absorption Spectra Analysis, now U. S. Patent No. 2,775,160, there is disclosed a method and apparatus for gas analysis in which in the preferred embodiment of the invention the two selected wave lengths of light are determined by a rotating sector wheel which is positioned between the source of light and the light-intensity measuring element. In the aforementioned application a collimated beam of light is chopped by a rotating sector wheel which is made up of alternate sectors of two appropriate narrow band-pass light filters of the interference filter type.

The above-described system, however, has two rather serious drawbacks. The first is that the sector wheel is rather expensive to manufacture and greatly increases the overall cost of the instrument. Second, the abrupt change in light energy reaching the detecting unit when first one of the filters is moved out of the light path and a second one of the filters, passing a different wave length of enegry, is moved into the path, introduces serious transients into the electronic system, which tend to affect the overall accuracy of the instrument.

An object of the present invention is to provide a method and apparatus for absorption spectra analysis which utilizes a single homogeneous rotating filter.

Another object of the present invention is to provide a method and apparatus for absorption spectra analysis which utilizes a property of narrow band-pass interference type light filters to obtain the desired two bands of light energy.

A further object of the present invention is to provide a method and apparatus for absorption spectra analysis which utilizes a rotating narrow band-pass interference type filter to change the angle of incidence between the light and the filter.

Still another object of the present invention is to provide a method and apparatus for asborption spectra analysis which utilizes a rotating narrow band-pass interference type light filter which is rotated to change the angle of incidence between the light beam and the filter. This arrangement provides for a smooth change from the absorption band spectra to a spectrum which is not absorbed by the medium to be analyzed, and therefore greatly reduces boundary area conditions which would otherwise introduce harmonics and distortion into the measuring equipment.

Another object of the present invention is to provide a method and apparatus for absorption spectra analysis which utilizes a narrow pass-band interference type light filter which is rotated so that the angle of incidence between the filter and the beam of light varies during rotation in which the two bands of light passed by the filter may be altered by varying the maximum and minimum angles of incidence.

Still another object of the present invention is to provide a method and apparatus for absorption spectra analysis which may be built cheaply, is compact, and which is extremely accurate over a very wide range of temperatures.

Other uses and advantages of the invention will become apparent upon reference to the specification and drawings, in which:

Figure 2 is a cross-sectional view of the preferred embodiment of the present invention.

Figure 1:
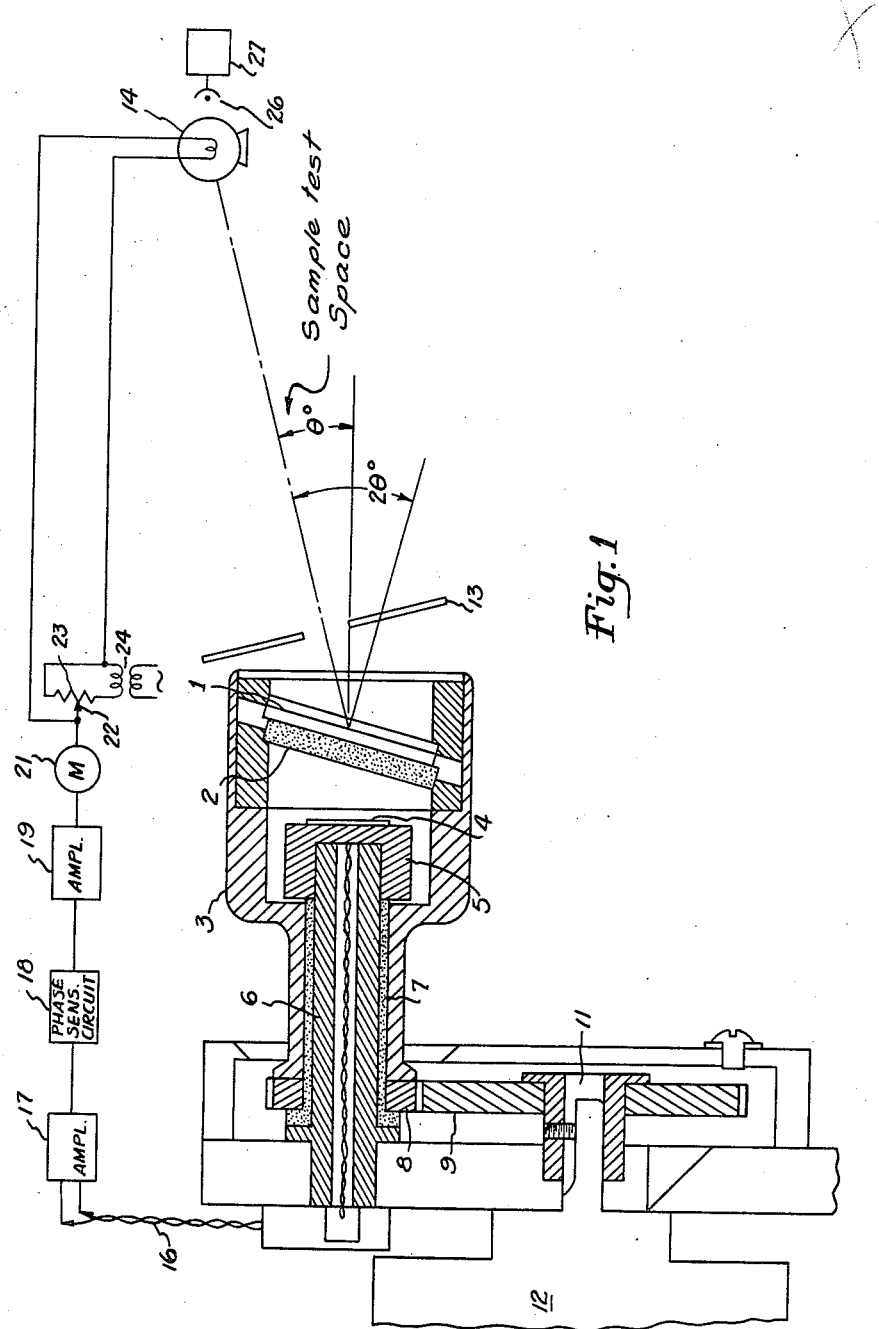
Figure 1 is a view of a first embodiment of the present invention.

In accordance with the invention a method and apparatus is provided whereby a beam of light from a suitable source is directed through a fluid sample or through the atmosphere in the region labeled "Sample Test Space" in Figs. 1 and 2 and impinges upon a detector responsive to rapid changes in light intensity. The light beam is broken up into two rapidly oscillating groups of light waves one of which is subject to absorption by the material to be analyzed and the other of which is unaffected by the material to be analyzed. The light energy striking the detector is converted to an electrical signal, the strength of one component of which is constant for a given light intensity at the light source and the other component of which varies as a function of the concentration of the material being analyzed. The signal from the detector is evaluated to thereby indicate the concentration or the mass of the material in question in the sample. The two closely related light-wave bands are obtained by using a narrow band-pass interference-type filter which is rotated so that the angle of incidence between the light beam from a source of light is changed during the rotation of the filter about the axis of rotation. It has been determined that these filters change their transmission properties in a known manner with respect to the angle of incidence of the incoming light beam.

Thus, for example, if the filter is initially positioned perpendicular to the incoming light it will pass a narrow band of energy centered about a wave length of 1.5 microns. If, however, the filter is tilted for instance 10 degrees from the perpendicular the center of the pass band may be lowered to 1.45 microns, at 20 degrees the center of the pass band may be 1.40 microns, and at 30 degrees the pass band center may be 1.35 microns. If, for example, the filter is mounted with its axis, which would be a line perpendicular to and through the center of the filter, an an angle of 15 degrees to the axis of rotation and the light beam is likewise at an angle of 15 degrees with the axis of rotation, the angle of incidence of the beam to the filter will vary from zero to 30 degrees and back as the filter rotates. Consequently, the center of the band passed by the filter will vary continuously from 1.5 microns to 1.35 microns and back to 1.5 microns during each revolution. The pass bands noted above are merely for the purpose of explanation, and the various bands passed by any particular filter will vary with the properties of the particular filter being used. By appropriately choosing the variation in angle between the filter and the incoming light beam two bands of light can be obtained, one of which lies within the absorption spectra of the material to be analyzed and the second of which lies outside of the absorption spectra but close by the band of the first light waves. Since there is a smooth transition from one band to the other as the angle between the filter and light beam is changed, there are no abrupt changes or boundary conditions introduced by this filter and few harmonics or transients are introduced into the electronic measuring equipment. Also, since a single homogeneous filter may be utilized, the cost of the instrument is greatly reduced; actually, in practice, by at least half.

In the first embodiment of the present invention the photocell is positioned behind the rotating filter, a photocell remaining stationary. In this embodiment the filter is mounted in a hollow cylindrical body and the photocell is mounted within the hollow in the cylinder. The cylinder is caused to rotate by a motor operating through an appropriate gear train. In the preferred embodiment of the present invention the filter and photocell are mounted in the same body which is positioned on the end of the shaft of the motor. The photocell and motor are rotated together, the photocell being physically mounted on the back of the filter. The output of the photocell is connected to slip rings also mounted on the shaft of the motor, the slip rings being contacted by appropriate brush mechanisms. The measuring and indicating equipment utilized in the present invention would be the same as the null systems provided in the aforementioned copending application. Thus, the system may be balanced by merely changing the temperature of the light source. It is well known that the ratio of energies available in the various bands of a spectrum vary with the temperature of the light source. Therefore by varying the temperature of the light source in an appropriate manner the energies reaching the photocell may be made equal although a portion of the energy of one of the bands is being absorbed by the material to be measured.

As disclosed in the aforementioned application, if the source of light energy utilized is the sun, rebalancing is obtained by varying the position of a wedge-shaped filter which is located between the sun and the rotating filter. The wedge used has a differential transmission with reference to the absorption and the reference bands in question. Balance is achieved by changing the position of the wedge by moving it into or out of the light from the sun.

Referring to Figure 1 of the accompanying drawings, there is provided a narrow band-pass type light filter 1 which has mounted on the back thereof a light diffuser 2. The filter is mounted in a housing 3 which comprises a cylindrical hollow housing at its right-hand portion. The filter is mounted at some angle other than 90 degrees with respect to the housing 3. A photoelectric element 4 is mounted on the photocell mount 5 which is secured to the end of the stationary shaft 6, the photoelement 4 and mount 5 being positioned in the hollow housing 3 in the right-hand portion thereof. A bearing element 7 is positioned concentrically about the shaft 6 and secured thereto. The left-hand portion of the housing 3 has a reduced internal diameter which is positioned about and contacts the bearing 7. Positioned at the left-hand end of housing 3 is an annular gear 8, the teeth of which mesh with a gear 9. The gear 9 is secured to the shaft 11 of the drive motor 12. A circular light-defining aperture 13 is positioned in front of the filter 1 so as to insure that only the light from a source 14 impinges upon the filter 1. It will be noted that the axis of rotation of the housing 3 lies at some predetermined angle with respect to the axis of the beam of light from the light source 14, which beam is directed through the aperture 13 and onto the filter 1. Also, the filter 1 is mounted at some angle less than 90 degrees—that is, at some angle between 0 and 90 degrees—with respect to the axis of rotation of the housing 3. When the motor 12 is energized, the housing 3 is caused to rotate through the action of the gear train 8 and 9 and causes the filter 1 to assume what might be called a wobbling motion. This is, as shown in the figure, the filter 1 is at some angle less than 90 degrees with the axis of the light coming from the source 14. However, when the filter has been rotated through 180 degrees with respect to the position shown in Figure 1, the face of the filter will at that point be at an angle of 90 degrees with respect to the axis of the beam of light. Therefore it can be seen that the angle of incidence of the light beam upon the face of the filter is varied through a predetermined angle during a revolution of the housing 3. As pointed out previously, the band-pass characteristics of the filter 1 change with the angle of incidence of the light beam upon the face of the filter. Thus, referring back to the same example as presented in the prior brief description of the invention, if the band pass characteristic of the filter is centered about 1.50 microns when the face of the filter is perpendicular to the light beam, then the band pass will shift as the angle of incidence changes. In the example the maximum angle of incidence was assumed to be 30 degrees, at which point the band pass characteristics of the filter was centered about 1.35 microns. The wave length of the light passed by the filter is a maximum when the angle of incidence between the light beam and the center of the filter is zero, and this fact allows a great deal of tolerance in the manufacture of the filter. As long as the band passed at zero angle of incidence is equal to or greater than the maximum wave length required, the system, within limits, can be adjusted to pass, alternately, the desired wave lengths.

The major effect of changing the angle ($\theta$) of impinging light with respect to the axis of rotation, is to shift both the maximum and minimum wave lengths. In general, increasing the angle ($\theta$) shifts both bands of energy toward the short wave length side.

The major effect of varying the angle between the axis of rotation of the housing and the transverse axis of the filter, is to change the degree of separation of the maximum and minimum wave lengths. In general, increasing the angle increases the separation of the bands of energy. Therefore, with a given filter manufactured to ordinary tolerances, mechanical adjustments can be made during alignment to obtain the desired band pass wave lengths, with an optimum amount of separation.

The output of the photocell 4 is connected over leads 16 to the input of an A.-C. narrow-band amplifier 17, the output of which is connected to a phase-sensitive circuit 18. The output of this circuit is amplified by amplifier 19 the output of which controls the motor 21. Since the filter alternately produces two groups of light beams, the output signal of the photo-cell 4 may be thought of as consisting of two components 180 electrical degrees out of phase with respect to each other. The output of the phase sensitive circuit is a D.-C. signal the polarity of which depends upon which phase of the output signal from the photocell was of the greatest magnitude. Therefore the direction of rotation of the servo motor depends upon the relative magnitude of the two out-of-phase components of the A.-C. output of the photocell. The shaft of the motor 21 drives the slider 22 on a resistive element 23. The resistor 23 is connected through the transformer 24 to a source of alternating current. The output from across the portion of the resistor selected by the slider 22 is connected to the filament of the light source 14 and varies the current to the filament of the light source. By varying the temperature of the light source 14, the relative energy in the respective wave bands is varied until the output of the circuit 18 is zero. The total output of the source 14 is monitored by a photoelectric element 26, the output of which drives a recorder 27. By this measuring the total illumination or radiation of the source 14, a measure of the absorption properties of the media between the source and the photoelectric element 4 can be obtained.

In the preferred embodiment of the invention, which is shown in Figure 2 of the accompanying drawings, the filter 1 is mounted in the housing 3, which housing is secured to the shaft 11 of the motor 12. The photoelectric element 4 is mounted directly on the rear face of the filter 1 and its output is connected over the lead 16 to the slip ring 28. The slip ring is mounted on the rear of the shaft 11, the shaft being made hollow so that the lead 16 can be positioned in the shaft and connected to the slip ring 28 which is located on the opposite end of the shaft. A ground slip ring 28a is provided and brushes 29 contact the slip rings and are connected over the leads 31 to the appropriate null-balancing equipment which is identical to that described in connection with Figure 1. As in the case of the embodiment shown in Figure 1, the transverse axis of the filter 1 is at some predetermined angle with the axis of rotation of the shaft 11, thereby causing the filter to wobble with respect to the incoming beam of light from the source 14. The operation of this embodiment is identical with that shown in Figure 1. However, because the photocell is mounted on the back of the filter and rotates therewith, the construction of the instrument becomes extremely simple, and it is therefore less expensive to manufacture.

Both of the above embodiments provide an instrument in which the expensive sector wheel of the aforementioned copending application may be eliminated and in its place just a single homogeneous filter may be utilized. Also, as previously indicated, since the band pass of the filter is altered gradually in a cyclic manner there are no abrupt changes in the light energies reaching the photocell and therefore harmonic distortion and transient interference is much reduced in this instrument. The instrument is therefore much cheaper to build and its accuracy is greatly increased. Also, since it is possible to change the band pass characteristics of the system by merely changing the angle of incidence of the incoming beam, the manufacturing tolerances of the filter may be larger than would otherwise be expected.

It will be apparent that the embodiments shown are only exemplary and that various modifications can be made in construction and arrangement within the scope of the invention as defined in the appended claims.

What is claimed is:

1. In an absorption spectrum analyzer of the type described, the method of producing two groups of light waves which are closely related in the light spectrum and in which one of the groups of light waves lies in the absorption spectrum of a medium which is to be analyzed and in which a second of the groups of light waves lies in a region of the spectrum which is unaffected by the medium, which method comprises directing a beam of light at a transmission-type narrow band-pass light filter and periodically varying the angle of incidence between the face of the filter and the beam of light through a predetermined angle.

2. In an absorption spectrum analyzer of the type described, the method of producing two groups of light waves which are closely related in the light spectrum and in which one of the groups of light waves lies in the absorption spectrum of a medium which is to be analyzed and in which a second of the groups of light waves lies in a region of the spectrum which is unaffected by the medium, which method comprises directing a beam of light at a transmission-type narrow band-pass light filter and rotating the filter about an axis which passes through the center of the face of the filter and which intersects the axis of the filter at an angle less than 90 degrees.

3. The method of analyzing the absorption characteristics of a fluid medium by comparing the light energy contained in a first wave band of the light spectrum which lies within the absorption spectrum of the fluid medium with the light energy contained in a second wave band of the light spectrum which lies outside the absorption spectrum of the fluid, which method comprises directing a beam of light through the fluid medium at the face of a transmission-type narrow band-pass light filter, cylcically varying the angle of incidence between the face of the filter and the axis of the beam of light and comparing the light energy passed by the filter when the angle of incidence is a minimum with the light energy passed by the filter when the angle of incidence is a maximum.

4. The method of analyzing the absorption characteristics of a fluid medium by comparing the light energy contained in a first wave band of the light spectrum which lies within the absorption spectrum of the fluid medium with the light energy contained in a second wave band of the light spectrum which lies outside the absorption spectrum of the fluid, which method comprises directing a beam of light through the fluid medium at the face of a transmission-type narrow band-pass light filter, rotating the filter about an axis which passes through the center of the face of the filter and which intersects axis of the filter at an angle less than 90 degrees to thereby cyclically vary the angle of incidence between the face of the filter and the axis of the beam of light and comparing the light energy passed by the filter when the angle of incidence is a minimum with the light energy passed by the filter when the angle of incidence is a maximum.

5. An absorption spectrum analyzer comprising a source of light, a transmission-type narrow band-pass filter, means for directing the light from said source through a fluid medium to be analyzed at the face of the filter, means for cyclically tilting the filter to vary the angle of incidence between the face of the filter and the axis of the beam of light and means for comparing the light energy passed by the filter when the angle of incidence is a minimum with the light energy passed by the filter when the angle of incidence is a maximum.

6. An absorption spectrum analyzer for determining the absorption characteristics of a fluid medium, comprising a source of light, a rotatable hollow member the axis of rotation of which intersects the axis of the light from said source at an angle between 90 degrees and 180 degrees, a transmission-type narrow band-pass filter in the form of a disk mounted in said hollow member, the transverse axis of said filter positioned at an angle between 0 degree to 90 degrees with respect to the axis of rotation of said hollow member, the light from said source passing through the fluid medium to said filter, a photoelectric means positioned to receive the light energy passed by said filter, means for rotating said hollow member to thereby cyclically vary the angle of incidence between the light from said source and said filter and null balancing means connected to the output of said photo electric means for comparing the light energy passed by said filter when the angle of incidence is a minimum with the light energy passed by said filter when the angle of incidence is a maximum.

7. The invention according to claim 6 in which said photoelectric means is mounted on the side of said filter away from said light source and slip ring means for connecting the output of said photoelectric means to said null balancing means.

References Cited in the file of this patent

UNITED STATES PATENTS

| | | |
|---|---|---|
| 2,166,824 | Runaldue | July 18, 1939 |
| 2,393,631 | Harrison et al. | Jan. 29, 1946 |
| 2,439,373 | Stearns | Apr. 6, 1948 |
| 2,462,946 | Coggeshall et al. | Mar. 1, 1949 |
| 2,534,846 | Ambrose et al. | Dec. 19, 1950 |
| 2,562,910 | Hardy | Aug. 7, 1951 |
| 2,708,389 | Kavanagh | May 17, 1955 |
| 2,729,143 | White | Jan. 3, 1956 |